Aug. 3, 1965  N. V. FRYE  3,197,928
FOLDING GROUND ANCHOR
Filed Feb. 19, 1962
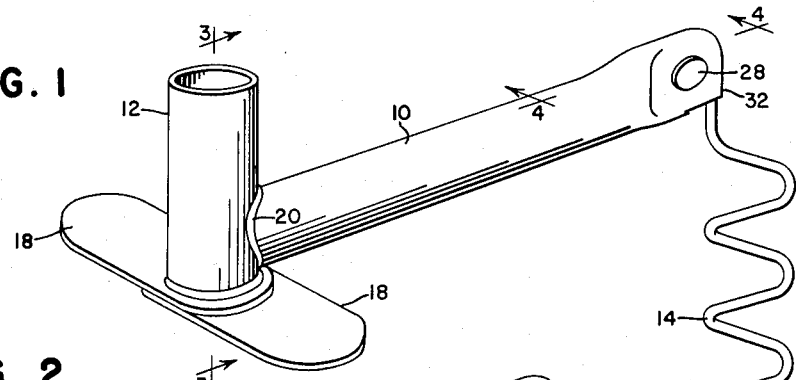
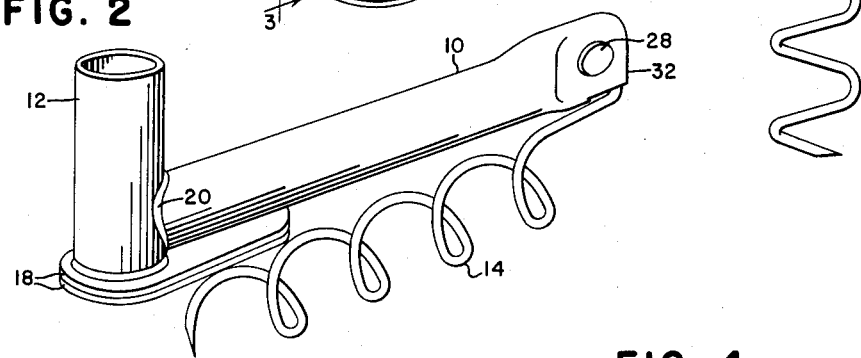
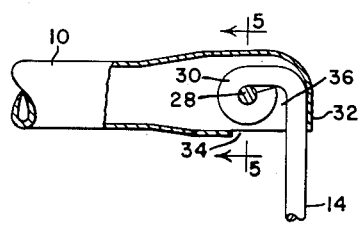
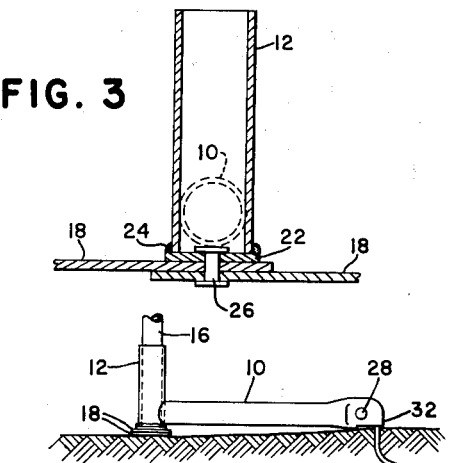
INVENTOR.
N. V. FRYE
BY
ATTORNEY

United States Patent Office 3,197,928
Patented Aug. 3, 1965

3,197,928
FOLDING GROUND ANCHOR
Norman V. Frye, R.R. 4, Davenport, Iowa
Filed Feb. 19, 1962, Ser. No. 174,107
4 Claims. (Cl. 52—157)

This invention relates to a folding ground anchor having principal utility as a pole or stake holder.

It is a principal object of the invention to provide an improved anchor or stake or pole holder which needs no guy wires and the like, and further to provide such holder for use in the erection of nets and lines for athletic events, games, etc. The invention finds special utility in the erection and supporting of nets for badminton, tennis and the like, wherein a net is stretched between a pair of stakes or poles which are affixed to the ground by the ground anchor portions of the improved holding means. It is another principal object of the invention to provide the ground anchor in such form that it may be readily collapsed or folded for the purposes of facilitating packaging and shipment thereof. In this respect, the invention features foldable portions which when in operative positions may add stability to the support but which when folded reduce the overall size of the structure from its operative status. A further object resides in an improved ground anchor of the character described, which is simple and inexpensive to manufacture and which, having relatively few moving parts, has a considerably longer life than those heretofore known.

The foregoing and other important objects and desirable features inherent in and encompassed by the invention will become apparent as a preferred embodiment thereof is disclosed in detail in the ensuing description and accompanying sheet of drawings, the figures of which are described below.

FIGURE 1 is a perspective view of the ground anchor in its operative condition.

FIGURE 2 is a perspective view of the same in its folded condition.

FIGURE 3 is a section, on a somewhat enlarged scale, as seen generally along the line 3—3 of FIGURE 1.

FIGURE 4 is a section as seen along the line 4—4 of FIGURE 1.

FIGURE 5 is a section as seen along the line 5—5 of FIGURE 4.

FIGURE 6 is a small-scale view illustrating a typical use of the ground anchor.

Reference will be had first to FIGURE 6 for a general discussion of the structure and its use. The anchor is shown as having an elongated horizontal member 10 provided at one end with upwardly extending or opening socket or coupling means 12 and at its other end with a ground-penetrating element, here in the form of a screw or auger 14. The operative relationship of the three parts 10, 12 and 14 is such that a crank is formed, the handle being established at 12 whereby the entire structure may be rotated about a vertical axis as the element 14 is screwed into the ground, the member 10 ultimately assuming a generally horizontal position as shown so that the upwardly opening socket means is capable of receiving a pole, stake or the like, as at 16. The length and pitch of the screw 14 is such that adequate connection to the ground is effected, and guy wires and other bracing means are not required, particularly in those cases when the pole, as at 16, is tensioned in a direction to the left as seen in the drawing, because this places compressive forces on the bottom of the socket means, which is here augmented by a pair of ground-surface-engaging elements 18, which will be described in detail below.

As best seen in the larger views, the member 10 is preferably tubular, as is the socket means 12, and the two are rigidly united, preferably by welding at 20. The initially open bottom of the tube that forms the socket means 12 is closed by a washer or equivalent closure member 22, welding again being relied upon, at 24, for example, to effect the connection. The closure member 22 is centrally apertured to receive a vertical pivot pin in the form of a rivet 26 which passes through the inner ends of the opposite ground-surface engaging elements 18, which elements will hereinafter be referred to as wings.

On the basis of a comparison of FIGURES 1 and 2, it will be seen that the pivot means at 26 connects the two wings 18 to the under portion of the ground anchor for swinging between operative and folded positions, represented by FIGURES 1 and 2 respectively. In FIGURE 1, the wings extend laterally outwardly and therefore have a substantial ground contacting area, sufficient to stabilize the entire support. In other words, the extended wings 18 increase the lateral dimension of the anchor. As seen in FIGURE 2, the two wings may be folded beneath each other and in turn folded beneath the under forward portion of the member 10, thereby reducing the lateral dimension from that of FIGURE 1 to a relatively narrow lateral dimension. This, in conjunction with the foldability of the screw 14, reduces the bulk of the article so that it may be readily packaged and shipped.

The foldability of the screw 14 is established by means including a transverse horizontal pivot at its upper end, here in the form of a transverse rivet or pin 28 which operates in conjunction with an eye 30 formed at the upper end of the rod of which the screw 14 is constructed. The end portion of the member 10 in the area of the rivet 28 and eye 30 is flattened and closed as illustrated, so that a rear or outer wall portion is provided at 32 which establishes a one-way stop to limit swinging of the screw 14 to the position of FIGURES 1, 4 and 6. The under or bottom wall of the rear portion of the member 10 is cut away to provide an opening 34 through which the upper portion of the screw 14 extends. The formation of the eye 30 and the dimension of the opening 34 are such that the foldability of the screw is readily assured. This is best exemplified by formation of the eye in such manner that a space exists at 36 to accommodate the underwall portion just ahead of the opening 34 when the screw is in its folded position.

The assembly of the anchor may be accomplished in any of several fashions so as to achieve the ultimate product which has the advantages and characteristics already noted. In the folded position of the screw 14, it lies closely beneath and parallel to the member 10, thus reducing the vertical dimension of the product from that of FIGURE 1 to that of FIGURE 2. The foldability of the wings or ground- surface-contacting elements 18 has already been described, it being clear that the ground-engaging elements represented by the wings 18 and screw 14 are selectively movable between the operative and folded positions already referred to. The increase of the ground-contacting area afforded by the elements 18 cooperates with the screwed-in status of the screw 14 to give the anchor considerable stability, particularly in opposite lateral directions as respects the long axis of the member 10. Also, as already referred to, the upstanding tubular part 12 serves as a handle whereby the anchor may be "cranked" into and out of the ground.

Features and advantages other than those already enumerated will readily occur to those versed in the art, as will many modifications and alterations in the preferred embodiment disclosed, all of which may be achieved without departure from the spirit and scope of the invention.

What is claimed is:

1. A ground anchor, comprising: an elongated relatively narrow member adapted to lie normally on the ground and having first and second opposite terminal end portions; coupling means carried by and rising from said first end portion; an operatively vertical ground-penetrating screw in depending relation to the second end portion of the member and having an upper end proximate to said second end portion and a lower free end adapted to enter the ground; connection means permanently connecting said upper end to said second end portion and constraining the two for rotation together about the axis of the screw whereby the member serves as a horizontal lever arm and the coupling means as an upright handle to afford a crank for turning the screw into the ground; and said connection means including a transverse horizontal pivot enabling swinging of the screw relative to the member to a folded position out of the ground and lying lengthwise along the member with its free end adjacent to the first end of the member.

2. The invention defined in claim 1, including: a ground-surface-engaging element disposed beneath and having a vertical pivotal connection to the first end of the element for selective swinging between an operative position projecting laterally from the member, to afford stability thereto when said screw is in the ground, and a folded position lying beneath the member and extending toward said second end portion of the member.

3. The invention defined in claim 1, including: one-way stop means cooperative between the second end of the member and the upper end of the screw and operative to limit relative swinging of the screw to a range of approximately 90° between its depending and folded positions.

4. The invention defined in claim 1, including: stabilizing means comprising a pair of wings and a vertical pivot connection pivoting said wings together and to said first end portion and adapted to extend laterally oppositely outwardly from said first end portion in operative stabilizing position when the screw is in the ground and swingable about said vertical pivot connection to folded positions in overlapped relation to each other and beneath said member and extending toward said second end of the member.

References Cited by the Examiner

UNITED STATES PATENTS

| | | | |
|---|---|---|---|
| 415,825 | 11/89 | Taylor | 189—28 X |
| 2,490,187 | 12/49 | Young | 189—92 |
| 2,653,688 | 9/53 | Gordon | 189—91 |
| 2,786,641 | 3/57 | Applegate | 248—46 |
| 2,876,974 | 3/59 | Liftman | 248—44 |
| 3,069,021 | 12/62 | Gray | 248—156 X |
| 3,076,532 | 2/63 | Frye | 189—91 X |

FOREIGN PATENTS

| | | |
|---|---|---|
| 1,498 | 9/08 | Great Britain. |
| 265,715 | 2/27 | Great Britain. |

FRANK L. ABBOTT, *Primary Examiner.*

JACOB L. NACKENOFF, RICHARD W. COOKE, JR.,
*Examiners.*